A. G. PATTON.
Cooking Stove.
No. 83,085.
Patented Oct. 13, 1868.
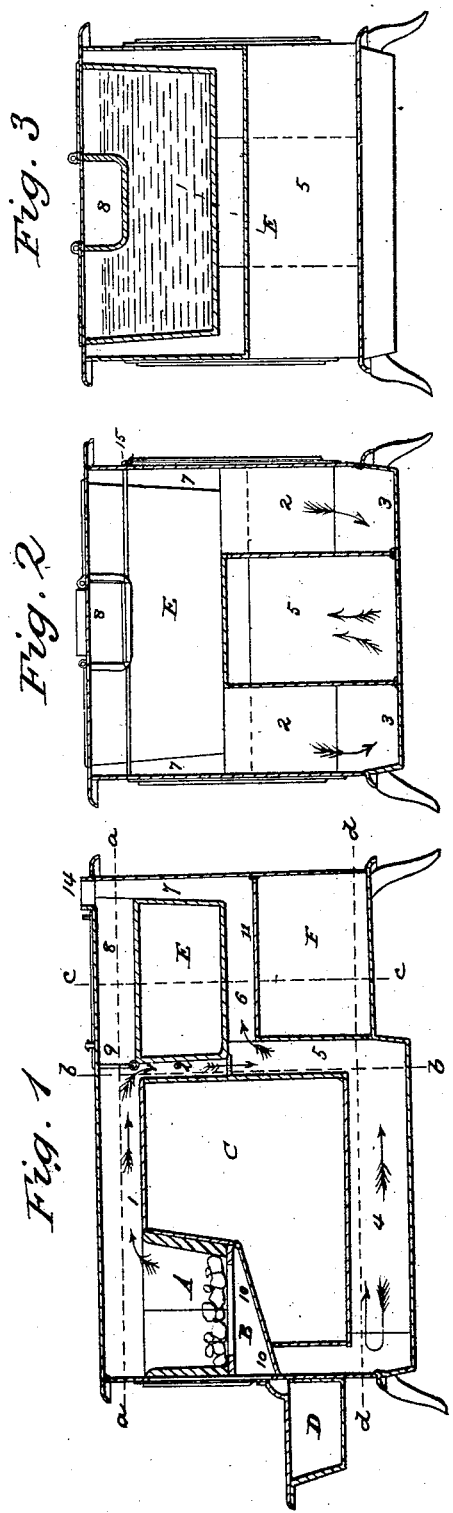
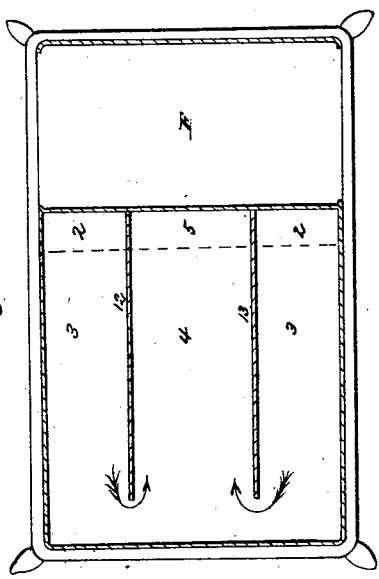
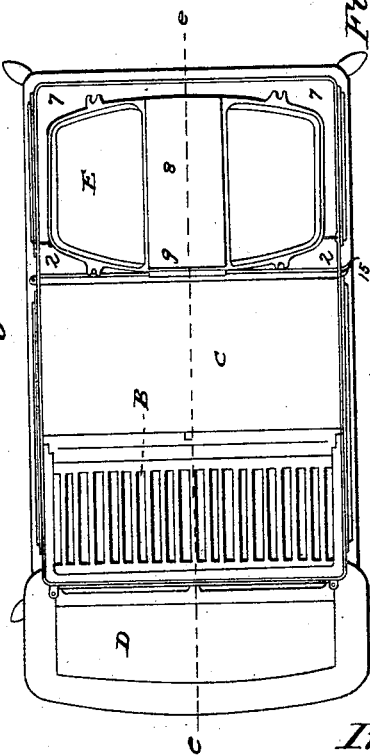
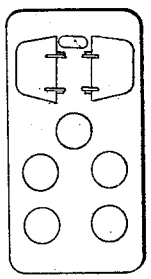
Witnesses:
Inventor:

ALEXANDER G. PATTON, OF TROY, NEW YORK.

Letters Patent No. 83,085, dated October 13, 1868.

IMPROVEMENT IN COOKING-STOVES.

The Schedule referred to in these Letters Patent and making part of the same.

*To all whom it may concern:*

Be it known that I, ALEXANDER G. PATTON, of Troy, in the county of Rensselaer, and State of New York, have invented a new and useful Improvement in Cooking-Stoves; and I do hereby declare that the following is a full, clear, and exact description of the same, reference being had to the annexed drawings, making part of this specification, in which—

Figure 1 is a vertical longitudinal section on the line $e\,e$ of fig. 4;

Figure 2 is a vertical transverse section on line $b\,b$ of fig. 1;

Figure 3 is a vertical transverse section on line $c\,c$ of fig. 1;

Figure 4 is a horizontal section on line $a\,a$ of fig. 1;

Figure 5 is a horizontal section on line $d\,d$ of fig. 1; and

Figure 6 is a top view of the stove, showing the arrangement of the apertures for the reception of vessels for cooking and heating.

Corresponding letters and figures denote corresponding parts in the several figures.

The object of this invention is an improvement in cooking-stoves, and may be described as consisting of a stove having a water-reservoir, and a warming-closet arranged therein, and forming a constituent portion thereof.

I am aware that cooking-stoves have been constructed, having water-reservoirs and warming-closets as appendages thereto; but I am not aware that previous to the date of my invention, there has ever been constructed or invented a stove having these appliances within, and forming a constituent part of such stove.

A is the fire-box, which is lined with fire-bricks in the usual or any convenient manner.

B is the grate, which is of ordinary construction.

C is the oven, which may be arranged as shown in fig. 1, or in any other manner.

D is the hearth, with its receptacle for ashes which pass through the grate and fall upon plate 10, by which they are conveyed thereto.

The above-named parts may be of any approved construction, but as they do not constitute any portion of my present invention, they need not be more particularly described here.

E is a water-reservoir, which is formed or placed within the rear portion of the stove, or that portion of the stove which extends rearward from the oven. This reservoir is of sufficient size to occupy the space allotted to it within that portion of the stove in which it is formed, with the exception of a suitable space, which is left on all sides of it for the heat to pass which envelopes it, with the exception of a portion of its upper surface, thus securing the ready heating of the water contained therein.

F is a warming-closet formed within the stove by means of the usual outside plates of such stove, and a division-plate, 11, which is placed above it, as shown in fig. 1 of the drawings, which plate also serves as the bottom plate of flue 7, to be hereafter described. The location of this closet within the stove, is immediately beneath the water-reservoir, as will be seen by reference to figs. 1 and 3 of the drawings.

G is the top plate of the stove, which is constructed in the ordinary way, except that it has arranged in that portion of its surface which is immediately over the fire-box and the oven, apertures for the reception of five boilers or kettles, the first four, or those nearest to the front of the stove, being in pairs, or so that a line drawn through any one of them will intersect a line drawn through the centre of any other one, while the fifth one is arranged with its centre upon a line drawn from front to rear, through the centre of the space which occurs between the other pairs of such apertures. This arrangement brings the fifth or additional aperture directly in front of the mouth of the flue or passage 8, to be hereafter described, so that when the damper controlling the mouth of that flue is open, the heated gases, as they pass from the stove, impinge with great force against any vessel which may be placed therein, thus economizing a considerable portion of the heat which would otherwise be lost. Another respect in which this top plate differs from those in use is, that in its rear end are formed apertures corresponding in size and form to those portions of the water-reservoir which are on either side of the flue or passage 8, which passes through it, which apertures have hinged covers attached to the stove-plate, so that when turned down, the water-reservoir is entirely enclosed within the outer portions or plates of the stove, but when these lids or covers are raised up, ready access is had to the contents of the water-reservoir.

1 is a horizontal flue, which extends from the fire-box rearward, and passes over the top of the oven to the rear part thereof, where it communicates with the vertical flue 2, which extends downwards between the water-reservoir and the oven to, or almost to the bottom of said reservoir, where it is divided into two side-flues, by coming in contact with the ascending flue 5, after which it continues to descend until it reaches the horizontal flues 3 3 in the lower portion of the stove, which are formed by the lower plate of the oven, the bottom plate of the stove, and the side-plates thereof, together with plates 13 and 12, which separate them from the central flue 4. The flues 3 3 extend horizontally from their point of intersection with the vertical flue 2, to near the front of the stove, where they communicate with the return horizontal flue 4. The flue 4 passes horizontally from front to rear of the stove until it reaches the vertically-ascending flue 5, with which it communicates, and through which the heated gases pass to the space or flues 6 and 7, which surround the water-reservoir, and which impart their heat to the warming-closet in addition to that already imparted from the flues 2 2 and 5.

The flue or space 6 is formed by the plate 11, which extends from front to rear of that portion of the stove which is in rear of the ovens, and directly beneath the water-reservoir, and a sufficient distance therefrom to leave the flue between them. Through this flue or space the heat passes horizontally to the vertical flue or space 7, where it comes in contact with the sides of the water-reservoir, after which it escapes through the aperture 14 in the top plate of the stove, which is provided with a flange for the purpose of receiving the pipe.

8 is a flue which extends from front to rear of the water-reservoir, through the upper portion of which it passes, and within which it is formed, as clearly shown in figs. 2 and 3 of the drawings. The mouth or front end of this flue is controlled by a damper, 9, which is hung upon a rod, 15, which passes through the side plates of the stove, and which is turned by a handle, as shown in fig. 4 of the drawings.

It will be observed that when this damper is closed, as at fig. 1, the heated gases are compelled to pass down the flues 2, and so on through the different flues, as indicated by the arrows in figs. 1 and 5, to the outlet, in which case, the flue 8 becomes a hot-air chamber, deriving its supply of heated air from flue or space 7, and imparting it to the contents of the water-reservoir. On the other hand, when this damper is opened, the products of combustion are permitted to pass directly through said flues to the outlet or pipes, and it is in this connection that the within-described arrangement of apertures becomes important, as, when this flue is used as a direct passage for heat from the stove, the last of the series of apertures is found to be the most important of any.

It will also be apparent, from an inspection of the drawings, that as a consequence of my arrangement of flues, I am enabled to remove a very serious objection which has long existed in cooking-stoves, namely, the difficulty of making the oven bake equally well or equally fast at the ends and in the centre thereof.

This difficulty is obviated in my stove by the construction of the descending flue 2, it being contracted in the centre, at the point where the smoke passes between the oven and the water-reservoir, by the curved form of the reservoir-plates, so that but a small amount of heat, comparatively, can pass down there, while at its outer ends it is made enlarged for the purpose of inducing a larger quantity to pass at these points, and thus, to a great extent, equalizing the heat within the oven.

The feet or supports, upon which the stove stands or rests, are of usual construction and arrangement, and need not be more particularly described.

Having described my invention,

What I claim, and desire to secure by Letters Patent, is—

1. A stove, so constructed as to embrace within itself a water-heating reservoir, and a warming-closet, both of which form a constituent part of said stove, the same being arranged substantially as shown and described.

2. The flue 8, formed in the water-reservoir, substantially as and for the purpose shown and described.

3. The construction of the vertical-descending flue or flues 2 2, for directing the greatest portion of the heat towards the ends of the oven, by means of the curved form of the fixed reservoir-plates, as shown and described.

4. The arrangement of the fixed water-reservoir, with reference to the flues 6 and 7, which surround said water-reservoir, substantially as shown and described.

5. The arrangement of the damper 9, with reference to the flue 8 and the additional aperture in the cover, G, of the stove.

6. The arrangement of flues 1, 2, 3, 4, 5, 6, 7, and 8, substantially as and for the purpose described.

In testimony whereof, I have signed my name to this specification in the presence of two subscribing witnesses.

ALEXANDER G. PATTON.

Witnesses:
D. P. HOLLOWAY,
J. M. BLANCHARD.